United States Patent [19]
Baitz et al.

[11] Patent Number: 5,363,281
[45] Date of Patent: Nov. 8, 1994

[54] DEVICE FOR RECEIVING AND LOCKING INTEGRATED CARDS IN A SUPPORT

[75] Inventors: Günter Baitz, Berlin; Joachim Burchart, Schlangen, both of Germany

[73] Assignee: Siemens Nixdorf Informationssysteme Aktiengesellschaft, Munich, Germany

[21] Appl. No.: 30,491

[22] PCT Filed: Sep. 25, 1991

[86] PCT No.: PCT/EP91/01822
§ 371 Date: Mar. 23, 1993
§ 102(e) Date: Mar. 23, 1993

[87] PCT Pub. No.: WO92/05512
PCT Pub. Date: Apr. 2, 1992

[30] Foreign Application Priority Data
Sep. 26, 1990 [DE] Germany ............... 4030455

[51] Int. Cl.[5] ............... H05K 7/14; H01R 13/62
[52] U.S. Cl. ............... 361/801; 361/796; 361/798; 361/740; 361/759; 439/61; 439/153; 439/157; 439/325; 439/345; 439/629
[58] Field of Search ............... 211/41; 361/732, 754, 361/755, 756, 759, 798, 801, 802, 608, 609, 725, 726, 727, 736, 740, 758; 312/333.1, 333.2; 439/60, 152, 153, 157, 160, 327, 328, 61, 325, 345, 629; 200/292, 50 R

[56] References Cited

U.S. PATENT DOCUMENTS

| | | | |
|---|---|---|---|
| 3,853,379 | 12/1974 | Goodman et al. | 361/756 |
| 4,157,583 | 6/1979 | Basmajian et al. | 361/801 |
| 4,547,835 | 10/1985 | Pansaerts et al. | 361/756 |
| 4,596,907 | 6/1986 | LaGreco et al. | 200/292 |
| 4,620,756 | 11/1986 | Gatti et al. | 439/157 |
| 4,821,146 | 4/1989 | Behrens et al. | 361/801 |
| 4,917,618 | 4/1990 | Behrens et al. | 361/801 |
| 5,151,847 | 9/1992 | Rautenberg | 361/801 |

FOREIGN PATENT DOCUMENTS

| | | | |
|---|---|---|---|
| 0336329 | 10/1989 | European Pat. Off. . | |
| 0336330 | 10/1989 | European Pat. Off. . | |
| 0385022 | 9/1990 | European Pat. Off. . | |
| 2618632 | 1/1989 | France | 361/759 |
| 2663810 | 12/1991 | France | 361/754 |
| 3310474 | 10/1983 | Germany | 361/759 |
| 3442397 | 5/1986 | Germany . | |
| 3636088 | 11/1987 | Germany | 361/756 |
| 3806771 | 9/1988 | Germany . | |
| 8902736 | 8/1990 | Germany . | |
| 0890577 | 12/1981 | U.S.S.R. | 361/756 |
| 1106031 | 7/1984 | U.S.S.R. | 361/756 |

OTHER PUBLICATIONS

International Standard, ISO 7816-1, International Organization for Standardization, 1987, pp. 1-4.

*Primary Examiner*—Leo P. Picard
*Assistant Examiner*—Donald A. Sparks
*Attorney, Agent, or Firm*—Hill, Steadman & Simpson

[57] ABSTRACT

Device for receiving integrated circuit cards. The devices used until now in practice do not sufficiently protect the individual cards in all operating modes. The present device is intended to allow the cards to be locked. For this purpose, a locking mechanism (16) is provided, having at least one bar (9) which is designed as a lever (20, 21, 22) and can be moved out of a locking position into an unlocking position and vice versa and which is preferably held in its locking position with the aid of a holding device (23). The holding device (23) may, for example, be a torsion spring (36). In the case of another embodiment, the locking mechanism (16) may additionally have a closable blocking device (44) which acts on one of the abovementioned levers and can be moved out of a blocking position, preventing a movement of the relevant lever (21, 22), into a release position, releasing a movement of the lever (21, 22), and vice versa. The device is suitable in particular for protecting a plurality of cards to differing degrees and for using these for different purposes in cash registers.

8 Claims, 1 Drawing Sheet

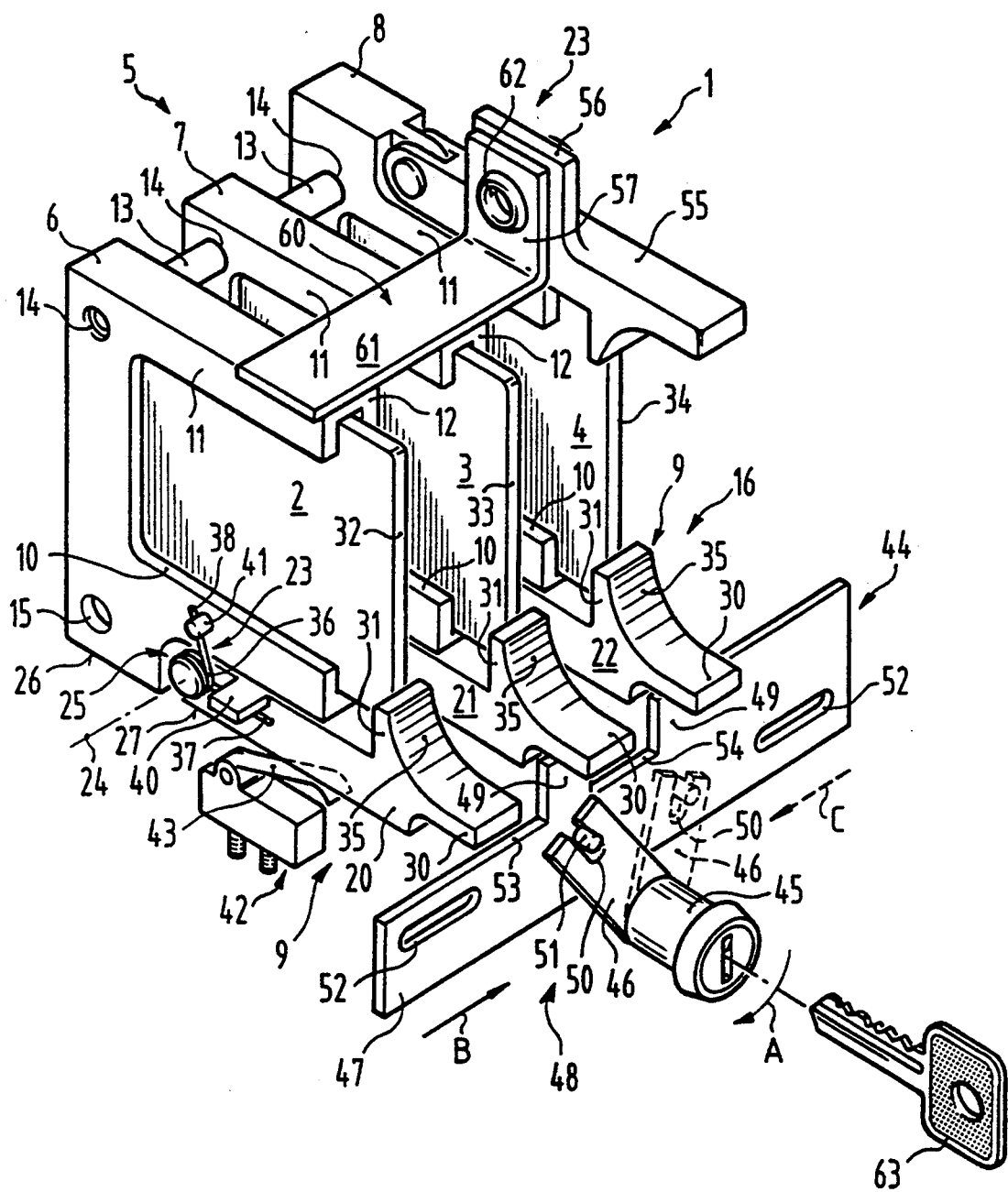

DEVICE FOR RECEIVING AND LOCKING INTEGRATED CARDS IN A SUPPORT

BACKGROUND OF THE INVENTION

The invention relates to a device for receiving integrated circuit cards.

There are already known quite generally devices in which the card is inserted into the slot-shaped guide until it comes up against a mechanical resistance. When the card is pushed in further, the resistance is overcome and the card is pushed with a predetermined force further into the slot-shaped guide, an electrical and/or mechanical contact being established between the card and the signal transmitting elements of the holder. In such a device, the card is held only unreliably in its operating position. In addition, such a device has no protection against removal.

German Utility Model G 89 02 736.1 already shows a device in which the cards inserted into their insert receptacles can be drawn completely into the insert area by means of a movable insert holder shared by all the cards and, in addition, can be covered by means of a lid mechanically coupled to the insert holder. This device is very complex in design and construction and does not allow, for example access to individual cards without consequently also relinquishing the protection of all the other cards at the same time.

U.S. Pat. No. 4,220,991 discloses a device wherein bars protect the cards against dropping out or else against unauthorized removal of the cards, since the assigned bars have to be actively released in each case for removal of the cards. However, the bars cannot protect the cards against deliberate removal. In many cases, for example in the case of cash register systems, it is however required that certain cards can in each case be removed only by certain, authorized persons.

SUMMARY OF THE INVENTION

It is the object of the present invention to provide a device for receiving integrated circuited cards which, with a simple design ensures additional protection of the cards against unauthorized removal.

This object is achieved according to the invention by a device for receiving circuit carriers in card form, in particular chip cards with integrated circuits, having a number of insert receptacles corresponding to the number of cards to be received. A card can be inserted into a respective receptacle in the direction of the plane of the card. Means for protecting the cards in their inserted operating position, have in each instance a bar which is assigned to a card and can be pivoted between an unlocking position, pivoted out of the plane of the card, and a locking position, pivoted into the plane of the card and engaging behind a locking edge of an inserted card. The means for protecting the cards are assigned a lockable blocking device which acts on at least one bar and which can be moved out of a blocking position, preventing a movement of the bar out of the locking setting, into a release position, releasing a movement of the bar, and vice versa.

Such a device is used, for example, in cash registers. The lockable cards may in this case by a company card for a cashier to log on at the cash register and for switching on the operational functions of the cash register, a manager's card or a so-called memory-fiscal card for storing and relocating information stored in the cash register which is of relevance to the financial authorities.

According to the invention, the locking mechanism is assigned a closable blocking device which acts on at least one bar and can be moved out of a locking position, preventing a movement of the bar, into a release position, releasing a movement of the bar, and vice versa. As a result, the individual cards can be protected to different extents, so that certain cards can be removed from the device only by selected persons. Depending on its position, the blocking device prevents or allows an actuation of the lever, it being quite possible that certain cards can be inserted into the sliding guide of the frame or removed from it any time, i.e. irrespective of the position of the blocking device, while others can be inserted or removed only in dependence on the position of the blocking device.

In the case of a first embodiment, the blocking device is a sliding bar which is provided with a lock and which, in the locking position of the respective bar, can be moved into and out of the pivoting range of the latter. In the case of this embodiment, each individual lever may be acted upon by a sliding bar, so that certain cards can be inserted or removed only by those persons who have a key corresponding to the lock.

In the case of another embodiment, the blocking device has a single sliding bar with a cam profile having cams which are assigned in each case to individual bars and which, in the locking position of the bar, can be moved into and out of the pivoting range of the latter, it being possible for the cam profile to be displaceable by means of an actuating device. The actuating device preferably has a pivoting arm, which is provided with a lock, and a pin, which is connected to the sliding bar and on which the pivoting arm acts. The use of a lock bar with cam profile has the advantage that said bar, acting on a plurality of levers, can be actuated with just one actuating device and consequently with just one key. The pivoting arm preferably has a guide slot or an elongate clearance for receiving the pin, so that a pivoting movement of the pivoting arm can be simply converted into a displacing movement of the sliding bar. The radial displacement of the pin thereby occurring with respect to the pivoting axis of the pivoting arm can be accommodated particularly easily by the guide slot, the elongate clearance or a long hole.

The cam profile may be designed to act simultaneously on a plurality of levers, it being possible for the cams or clearances of the cam profile to be designed in such a way that a pivoting movement of individual or all levers or some of the levers is allowed or prevented. The cam profile may also be designed in such a way that no lever can pivot out of its locking position into its unlocking position or that one or more levers are held in their unlocking position and cannot pivot back into their locking position.

Adjoining the respective cam, the cam profile advantageously forms a clearance, the width of which corresponds at least to the width of the bar and the depth of which corresponds at least to the locking displacement of the bar. As a result, a pivoting movement of the bar in lever form about its pivoting axis is either permitted or prevented, it being possible for the clearances also to be of such a width that individual bars cannot be acted upon by the cam profile, so that they can be actuated without impairment by the blocking device.

In the case of another further development, at least one frame is assigned a further bar, which is designed essentially similarly to the one bar and is arranged opposite the latter on the frame. In this case, as further protection, there may be provided an angle which is lead-sealed to the further bar and is firmly connected to the frame. This embodiment represents an additional protection of the device and may be provided in conjunction with the blocking device, previously discussed, or else independently of the latter or in its place. The lead seal between the angle and the further lever may be applied by a supervisory authority, such as for example by the tax office. The card protected by such a device can therefore only be removed from the sliding guide of the frame by destroying the lead seal. Such a card may contain or be a so-called "memory-fiscal card", which stores and/or processes data of relevance to the tax office.

Furthermore, it is favorable that at least one lever and/or the blocking device is assigned a switch which senses the locking or unlocking position of the lever or of the blocking device and indicates this preferably to a data processing system. In this way, for example a cashier can log on at a certain cash register. In addition, in this way proper storage of all data and of the date and time of removal or insertion of the card is possible. The information of a multiplicity of cards can in this way be centrally acquired, displayed and evaluated.

The device is preferably installed in a cash register, the cards being protected to differing degrees by means of the locking mechanism, the blocking device or the lead-sealable mechanical connection. This further development has the advantage that each card can be removed only by the person authorized to do so. The card protected just by means of the locking mechanism is advantageously a company card for logging on a cashier at the cash register and for switching on the operating functions of the cash register. In the case of another further development, the card protected by means of the locking mechanism and the blocking device is a manager's card, and the card protected by means of the lead-sealable mechanical connection is a memory-fiscal card, which both serve for relocating information stored in the cash register. Consequently, it is not possible, for example, for a cashier to remove the manager's card or the memory-fiscal card from the device and call up the information stored on it without destroying the device. In the case of a preferred further development, the memory-fiscal card is additionally protected by means of the blocking device, so that when this card is exchanged not only must a person from the supervisory authority be present but also the manager of the store.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts a diagrammatic perspective representation of a device for receiving differently protected cards.

DESCRIPTION OF THE PREFERRED EMBODIMENT

In the single FIGURE, a device 1 for receiving circuit carriers in card form, in particular cards 2, 3 and 4 such as "integrated circuit cards with contacts" in accordance with ISO Standard 7816 or else cards with contactless signal coupling, which are protected to differing degrees, are diagrammatically represented. The cards may be designed as so-called memory cards. The device 1 has a holder 5 with three sliding guides or frames 6, 7, and 8, which according to the FIGURE have in each case a left-hand side wall 11, provided with a clearance 10, and are designed in the form of a slot. The right-hand side wall 12, not shown in any more detail in the FIGURE, may be designed similarly to the left-hand side wall 11 or have a continuous side surface. In the continuous side surface there may be provided close to its rear edge, in the inserting direction, an arcuate clearance (not shown) for better grasping of a card.

According to the FIGURE, the frames 6, 7 and 8 of the holder 5 are connected to one another by means of a threaded bolt (not shown), which is led through a bore 14 which is provided on the front, upper end, in the inserting direction, of each frame. Fitted onto the threaded bolt in each case between two frames is a spacer 13, which keeps the frames parallel to one another and at a distance. A further threaded bolt may also be provided on the front, lower end, in the inserting direction, of each frame (not shown in any more detail) and inserted into a corresponding bore 15. For an improved side stability in the front region, the frames of the holder may also be connected to one another at their rear end in the inserting direction (not shown), it being possible for such holders or spacers to be fitted both on the upper and lower end, in the drawing, of each frame, but also exclusively at the top or bottom. Thus, with the aid of the threaded bolts and spacers 13, any number of frames can be connected next to one another and parallel to one another to form a compact holder 5. The screw fittings may also be provided, however, in a region between the front and rear end, in the inserting direction, of the respective frame.

According to the FIGURE, the cards 2, 3 and 4 are located in the frames 6, 7, and 8, the device 1 also having a locking mechanism 16 which is designed as a holding device and with the aid of which the cards are held in the slot-shaped sliding guide for the purpose of fixing their pushed-in operating position and are protected against removal. According to the FIGURE, the locking mechanism 16 has three bars 20, 21, 22, which are denoted altogether by 9, can in each case be moved out of a locking position, blocking the card in its operating position, into an unlocking position and vice versa and are held with the aid of a holding device 23 in their locking position (see FIGURE). The holding device 23 may also be omitted if the respective bar for example consists of a flexible material and is firmly connected to its sliding guide or is formed in one piece with the latter or is held in its locking position due to the force of gravity. In the case of this embodiment, the bar is preferably fastened on the upper side of the holder.

Each bar of the locking mechanism 16 is a lever 20, 21, 22 which extends parallel to the inserting direction of the card 2, 3, 4 and can pivot about a pivoting axis 24 through the plane defined by the plane of the card. Each lever 20, 21, 22 is mounted underneath the frame 6, 7, 8 in such a way on the holder 5 that it is arranged in a clearance 25 of the frame, the lower edge 26 of each frame aligning with the lower edge 27 of the respective lever. Each lever 20, 21, 22 has a catch 31, which is arranged close to its free end 30 and which engages behind the rear edge 32, 33, 34, in the inserting direction, of each card 2, 3, 4 in its operating position. In this case, according to the FIGURE, the catch encloses the lower corner of each card, so that the latter is protected in its operating position. Each catch 31 tapers toward the free end 30 of the lever 20, 21, 22 and has a knurling on its side pointing toward the free end of each lever.

Each lever 20, 21, 22 of the locking mechanism 16 is prestressed into its locking position, shown in the FIGURE, with the aid of the holding device 23. The holding device 23 is a spring 36, the one end of which 37 acts on the lever 20 and the other end 38 of which can be fastened, for example, on the frame 6 of the holder 5, is thus supported on the holder 5. In the FIGURE, the holding device 23, designed as spring 36, is shown just in the case of the left-hand outer lever 20; however, the two other levers 21, 22 have an identical holding device. According to the FIGURE, the spring 36 is designed as a torsion spring; it may, however, also be a tension spring or compression spring. The torsion spring is arranged in the region of the pivoting axis 24 of each lever, there being fitted on the lever 20, 21, 22 an on the holder 5 or the relevant sliding guide a lug 40, 41, respectively supporting one end 37, 38 of the torsion spring. The lug fastened on each lever may also be a plate connected in one piece with said lever (see FIGURE). The spring ends may also be simply inserted in bores provided on the lever and on the holder.

According to the FIGURE, the lever 20 is assigned a switch 42, which senses the locking or unlocking position of the lever and indicates this to a data processing system (not shown). The signal emitted by the switch may also be transmitted, for example, to the register electronics of a cash register. Such a switch may also be assigned, however, to the other levers 21, 22. The switch 42 has on its upper side a pivotable clip 43, which bears against the underside 27 of the lever 20. The clip 43 is prestressed in the direction of the lever 20 with the aid of a torsion spring (not shown). The torsion spring of the clip 43 may also be designed to be strong enough to keep the lever in its operating position, represented in the FIGURE. In this case too, the holding device 23 designed as spring 36 may be omitted. Instead of the switch 42, some other signaling device may also be provided for the position of the lever, for example a light barrier.

The switch may be a microswitch which indicates, for example, to the register electronics of a cash register the presence and/or imminent removal of a card. Such a card may, for example, be a company identity card of a user, for example of a cashier.

In addition to the bars designed as engageable levers 20, 21, 22, the locking mechanism 16 is also assigned a closable blocking device 44, which according to the FIGURE acts on two levers (21, 22) and has a sliding bar 47 which can be moved out of a blocking position (see FIGURE), preventing a movement of the relevant lever, into a release position, releasing a movement of the lever, and vice versa. On the blocking device there may be fitted a switch similar to the switch 42, which indicates its locking or unlocking state. The switches fitted on the bars 20, 21, 22 can then be omitted.

In addition, in a first embodiment (not shown), there may be provided a pivoting arm which is provided with a lock and which, in the locking position of the respective bar, can be moved into and out of its pivoting range. Such a pivoting arm may be assigned to each individual bar in lever form. The pivoting arm may in this case have a form resembling the pivoting arm 46, provided with a lock 45, in the FIGURE. In the case of this first embodiment, the lock is arranged approximately in the region between the free ends of the lever in such a way that the upper edge of the lock is arranged close to the plane running through the lower edge of the lever. In the blocking position, the pivoting arm is pivoted in such a way into the pivoting range of the lever held in its locking position that the pivoting arm is then arranged approximately horizontally.

In the case of a second embodiment, shown in the FIGURE, the blocking device 44 comprises the sliding bar 47 with a cam profile having cams 49 which are assigned in each case to individual bars 21, 22 and which, in the locking position of the respective bar, can be moved into and, for unlocking, out of its pivoting range. The movement of the cam profile 47 takes place by means of an actuating device 48, which is designed as a displaceable cam pusher, has the pivoting arm 46, provided with the lock 45, and a pin 51, connected to the cam profile 47, and on which the pivoting arm 46 acts. The pivoting arm 46 has at its free end, i.e. opposite from the lock 45, an elongate clearance 50. The elongate clearance may also be designed as a long hole or guide slot. The pin 51, connected to the cam profile 47, engages in the elongate clearance 50 of the pivoting arm 46. By a pivoting movement of the pivoting arm in the direction of the arrow A, a displacing movement of the pin 51, and consequently of the cam profile 47, in the direction of the arrow B takes place. The displacing movement of the cam profile 47 may be limited by long holes 52, which are made in the sliding bar and into which guide lugs (not shown) engage.

According to the FIGURE, the sliding bar 47 is arranged and designed so as to act simultaneously on the levers 21, 22, in which arrangement, adjoining the respective cam 49, the cam profile forms a clearance 53, 54, the respective width of which corresponds to at least the width of the free end of each bar (lever) and the depth of which corresponds to at least the engaging length of lever and card or to the locking displacement of the relevant bar, to be more precise to the engaging length between the catch 31 and the respective card. According to the embodiment represented, the cam profile does not act on the left-hand lever 20, so that the latter can be actuated, i.e. pivoted into its unlocking position, irrespective of the position of the cam profile. The cam profile 47 may, however, also be designed so as to act on all the levers, so that in this case three cams 49 and clearances have to be provided.

According to the two previously described embodiments, the blocking device 44 is pivotable (first embodiment) or displaceable (second embodiment) transversely to the inserting direction of the cards, the pivoting axis of the pivoting arm 46 in the case of the second embodiment lying below that of the first embodiment and below the cam profile 47. As a result, in the case of a displacing movement of the cam profile 47 in the direction of the arrow B, the pivoting arm 46 moves out of a position inclined to the left, according to the FIGURE, shown by solid lines, via its upper dead center position into a position inclined to the right, shown by broken lines.

According to the FIGURE, the right-hand card 4 is assigned a further bar 55, which essentially is constructed similarly to the bars designed as levers 20, 21, 22 and is arranged opposite the lever 22 on the holder 5. As a difference from the bars 20, 21, 22, the bar 55 has in its central region an approximately rectangular projection 56 which is connected in one piece with it, is provided with a through-bore (not shown) and is a small distance opposite a short leg 57 of an L-shaped angle 60, the short leg 57 of the angle 60 likewise having a through-bore 62, which aligns with the through-bore of the projection 56. Into these bores there can be inserted a locking bolt (not shown), which can be protected against unauthorized removal by a lead seal. The long leg 61 of the angle 60 is undetachably connected to the holder 5.

The individual frames of the holder may be designed symmetrically with respect to their longitudinal axis running in the inserting direction, so that each frame may also have on its upper end a clearance comparable to the clearance 25. Accordingly, lugs or pins for holding one end of a spring may also be provided on this end. In conjunction with the spacers 13, consequently a structural assembly for a device for receiving memory cards is obtained. It is furthermore possible to provide the levers 20, 21, 22 not on the underside, as shown in the FIGURE, but on the upper side of the holder (in this position, the holding device can be omitted) and to provide the lead-sealed connection between the lever 55 and the angle 60 for example on the underside of the holder 5. It is also conceivable to arrange the levers 20, 21, 22 and the abovementioned lead-sealed connection on the same side of the holder 5 or to assign the lead-sealed connection additionally to at least one of the levers 20, 21, 22. On the underside and/or upper side of each frame 6, 7, 8 there may be arranged between the pivoting axis 24 and its end pointing toward the lever a vertically extending projection which can engage in a correspondingly shaped clearance of the lever and guides the vertical pivoting movement of each lever in such a way that horizontal displacements in the direction of the arrow B or in the reverse direction are ruled out. For the sake of simplicity, contact points and signal transmitting elements of the cards and of the assigned frames are omitted in the drawing. The lead-sealed bar 55 may be provided on a card which is additionally protected by one of the levers 20, 21, 22, the possibility existing of protecting one of these last-mentioned levers additionally by the blocking device 44. The further bar 55 with the lead seal 62 may, however, also be provided on a memory card which is locked just with the aid of a lever which is not additionally protected by the blocking device 44, such as for example the lever 20. Just like the bars or levers, the blocking device may also be arranged on the upper side of the holder. The individual levers 20, 21, 22 may be fastened on the holder 5 in the region of their pivoting axis 24, for example by a bolt secured in the conventional way.

The operation of the device for receiving memory cards is described in more detail below.

First of all, the sliding bar 47 with the cam profile is adjusted by means of a key 63 and the lock bar 46 in the direction of the arrow B until the lever 22 can also be adjusted out of its locking position, shown in the drawing, into its unlocking position. At this time, the further bar 55 is not yet lead-sealed to the angle 60. Subsequently, the card 4 is inserted into the frame 8 of the holder 5, the lever 22 and the bar 55 being pivoted into their respective unlocking position. With the card 4 completely inserted, the lever 22 and the bar 55 snap back and consequently fix their locking position. Then the further bar 55 can be lead-sealed by a person authorized to do so.

Then the card 3 is inserted into the sliding guide of the frame 7 until the lever 21 again snaps back into its locking position. By subsequent turning of the key 63 counterclockwise, i.e. counter to the arrow A, the cam profile and the pivoting arm 46, represented by broken lines, are displaced in the direction of the arrow C, i.e. to the left, until the clearances 53, 54 neighboring the cams 49 are arranged between the individual levers. The respective cams 49 are then arranged directly below the lower edge of the levers 21 and 22, so that a pivoting movement of these levers into their unlocking position is not possible. The key 63 can then be withdrawn and handed to a supervisor.

The memory card 2 can be inserted at any time into the sliding guide of the frame 6 and withdrawn from it by a downwardly directed pressure on the free end of the lever 20 to overcome the force of the holding device 23. This illustrative embodiment consequently shows cards which are protected to varying degrees. Such an arrangement is preferably used in cash registers, the card not protected against removal by the blocking device 44 representing, for example, the company identity card of the cashier. By means of this card, the cashier logs on at the register and activates the operating functions of the register by means of the integrated circuits arranged on the card. During the course of the cashiering work, the amounts rung up by the cashier concerned are then stored on the card. The second sliding guide 7 may serve for receiving, for example, the manager's card. Recorded on it is information such as, for example, the sequence of the cashiers, daily takings etc. This card can be removed only when the blocking device can be displaced into its release position with the aid of a special key. The key is thus issued only to the manager.

The third slot-shaped guide 8 serves for receiving, for example, a "memory-fiscal card", which can be removed only after opening of the lead seal 62 and, if the latter also acts on the locking device for the memory-fiscal card, additionally by a displacing of the blocking device. The lead sealing can be performed by authorities authorized to do so, such as for example the tax office. It is clear that different information can be stored on the individual cards or different information or signals can be emitted from the individual cards to a system processing these signals.

If one of the cards 2, 3, 4 is to be removed from the holder 5, the associated bar 20, 21, 22, 55 must be brought out of engagement with the card—if appropriate after opening the blocking device 44. In this case, the switch assigned to the bar is actuated. This has the effect that any data processing operations in progress in the register electronics are properly completed and all the information to be stored and/or the removal time are stored on the card. Since this normally takes place in a fraction of a second, the storing operation is completed before the signal transmitting connection to the card is interrupted by its removal from the holder 5.

With the aid of the locking or blocking, proper storage of all data is also possible in various stages of protection.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A device for receiving circuit carriers in card form, in particular chip cards with integrated circuits, having a number of insert receptacles corresponding to a number of cards to be received, a card being inserted into a respective receptacle in a direction of a plane of the card, comprising:
- a plurality of means for protecting the cards in an inserted operating position thereof, each of the means for protecting having a bar which is assigned to a card and which is pivotable between an unlocking position, pivoted out of the plane of the card, and a locking position, pivoted into the plane of the card and which engages behind a locking edge of an inserted card;
- a lockable blocking device which acts on at least one bar of the bars of the means for protection and which is moveable between a blocking position, preventing a movement of the bar out of a locking setting, and a release position, releasing a movement of the bar, the blocking device having a sliding bar which is provided with a lock and which, in the locking position of a respective bar; can be moved into the blocking position and out of the release position over a pivoting range thereof;
- a plurality of frames and respectively assigned bars,
- the sliding bar having a cam profile having a plurality of cams which are assigned to respective bars and which, in the locking position of the respective bar, can be moved into and out of a pivoting range thereof; and
- actuating device for displacing the sliding bar, the actuating device having a pivoting arm, which is provided with a lock, and a pin, which is connected to the sliding bar and interacts with the pivoting arm.

2. The device as claimed in claim 1, wherein the pivoting arm has for receiving the pin a guide slot or an elongate clearance.

3. A device for receiving circuit carriers in card form, in particular chip cards with integrated circuits, having a number of insert receptacles corresponding to a number of cards to be received, a card being inserted into a respective receptacle in a direction of a plane of the card, comprising:
- a plurality of means for protecting the cards in an inserted operating position thereof, each of the means for protecting having a bar which is assigned to a card and which is pivotable between an unlocking position, pivoted out of the plane of the card, and a locking position, pivoted into the plane of the card and which engages behind a locking edge of an inserted card;
- a lockable blocking device which acts on at least one bar of the bars of the means for protection and which is moveable between a blocking position, preventing a movement of the bar out of a locking setting, and a release position, releasing a movement of the bar, the blocking device having a sliding bar which is provided with a lock and which, in the locking position of a respective bar, can be moved into the blocking position and out of the release position over a pivoting range thereof;
- the sliding bar having a cam profile having a plurality of cams which are assigned to respective bars and which, in the locking position of the respective bar, can be moved into and out of a pivoting range thereof the cam profile controlling pivoting of the respective bars between respective unlocking position and locking position; and
- the sliding bar being displaceable transversely to the inserting direction of a respective card.

4. A device for receiving circuit carriers in card form, in particular chip cards with integrated circuits, having a number of insert receptacles corresponding to a number of cards to be received, a card being inserted into a respective receptacle in a direction of a plane of the card, comprising:
- a plurality of means for protecting the cards in an inserted operating position thereof, each of the means for protecting having a bar which is assigned to a card and which is pivotable between an unlocking position, pivoted out of the plane of the card, and a locking position, pivoted into the plane of the card and which engages behind a locking edge of an inserted card;
- a lockable blocking device which acts on at least one bar of the bars of the means for protection and which is moveable between a blocking position, preventing a movement of the bar out of a locking setting, and a release position, releasing a movement of the bar, the blocking device having a sliding bar which is provided with a lock and which, in the locking position of a respective bar, can be moved into the blocking position and out of the release position over a pivoting range thereof;
- a plurality of frames and respectively assigned bars, at least one card being assigned to a further bar, which is substantially similarly to one of said assigned bars and which is arranged opposite the latter on a frame of the device, at least one of the bars being fixable in its locking position by a lead-sealable mechanical connection and said connection being provided in addition to or instead of the blocking device; and
- the sliding bar having a cam profile having a plurality of cams which are assigned to respective bars and which, in the locking position of the respective bar, can be moved into and out of a pivoting range thereof.

5. The device as claimed in claim 4, wherein each insert receptacle has signal transmitting contacts for connection of the integrated circuits of the inserted card to operating function elements of an electronic unit assigned to the device.

6. The device as claimed in claim 5, wherein the device is assigned to a cash register, and wherein the insert receptacles receive cards corresponding to a hierarchical superordination or subordination of predetermined business functions, hierarchically lower cards being protected by one of the bars, hierarchically higher cards being additionally protected by the blocking device and a hierarchically highest card being protected by the lead-sealable connection.

7. A device for receiving circuit carriers in card form, in particular chip cards with integrated circuits, having a number of insert receptacles corresponding to a number of cards to be received, a card being inserted into a respective receptacle in a direction of a plane of the card, comprising:
- a plurality of means for protecting the cards in an inserted operating position thereof, each of the means for protecting having a bar which is assigned to a card and which is pivotable between an unlocking position, pivoted out of the plane of the card, and a locking position, pivoted into the plane of the card and which engages behind a locking edge of an inserted card;

a lockable blocking device which acts on at least one bar of the bars of the means for protection and which is moveable between a blocking position, preventing a movement of the bar out of a locking setting, and a release position, releasing a movement of the bar; and at least one of the blocking device and the bars being assigned a switch which senses the locking or unlocking position of the at least one of the blocking device and the bars and which provides a signal indicative of the locking or unlocking position at least when the card is in an operational mode and contained in the respective receptacle.

8. A device for receiving circuit carriers in card form, in particular chip cards with integrated circuits, having a number of insert receptacles corresponding to a number of cards to be received, a card being inserted into a respective receptacle in a direction of a plane of the card, comprising:

a plurality of means for protecting the cards in an inserted operating position thereof, each of the means for protecting having a bar which is assigned to a card and which is pivotable between an unlocking position, pivoted out of the plane of the card, and a locking position, pivoted into the plane of the card and which engages behind a locking edge of an inserted card;

a lockable blocking device which acts on at least one bar of the bars of the means for protection and which is moveable between a blocking position, preventing a movement of the bar out of a locking setting, and a release position, releasing a movement of the bar;

at least one of the blocking device and the bars is assigned a switch which senses the blocking or unlocking position of at least one of the blocking device and the bars and which provides a signal indicative of the locking or unlocking position; and each insert receptacle having signal transmitting contacts for connection of the integrated circuits of the inserted card to operating function elements of an electronic unit assigned to the device.

* * * * *